(12) United States Patent  (10) Patent No.: US 11,688,212 B2
Appel et al.  (45) Date of Patent: Jun. 27, 2023

(54) MACHINE LEARNING TECHNIQUES FOR CLASSIFYING DRIVER BEHAVIOR

(71) Applicant: Upstream Security, Ltd., Herzliya (IL)

(72) Inventors: Yonatan Appel, Ramat Hasharon (IL); Yoav Levy, Kfar-Vitkin (IL)

(73) Assignee: UPSTREAM SECURITY, LTD., Herzliya (IL)

( * ) Notice: Subject to any disclaimer, the term of this patent is extended or adjusted under 35 U.S.C. 154(b) by 379 days.

(21) Appl. No.: 16/174,878

(22) Filed: Oct. 30, 2018

(65) Prior Publication Data

US 2019/0130664 A1  May 2, 2019

Related U.S. Application Data

(60) Provisional application No. 62/579,565, filed on Oct. 31, 2017.

(51) Int. Cl.
  *G07C 5/02* (2006.01)
  *G06N 20/00* (2019.01)
  *B60W 40/09* (2012.01)
  *G07C 5/00* (2006.01)

(52) U.S. Cl.
  CPC ............ *G07C 5/02* (2013.01); *B60W 40/09* (2013.01); *G06N 20/00* (2019.01); *G07C 5/008* (2013.01)

(58) Field of Classification Search
  CPC .......... G06N 20/00; G06N 5/00; G05B 13/00; G06K 9/66; B60W 40/00; B60W 2040/0809; B60W 2040/0818; B60W 2040/0827; B60W 2040/0836; B60W 40/09; B60W 40/10; B60W 40/105; B60W 40/107; B60W 40/11; B60W 2050/0016

See application file for complete search history.

(56) References Cited

U.S. PATENT DOCUMENTS

| | | |
|---|---|---|
| 7,102,496 B1 | 9/2006 | Ernst, Jr. et al. |
| 7,389,178 B2 | 6/2008 | Raz et al. |
| 8,463,488 B1 | 6/2013 | Hart |
| 9,067,565 B2 * | 6/2015 | McClellan ............... G08G 1/20 |
| 9,398,423 B2 | 7/2016 | Cordova et al. |
| 10,599,155 B1 * | 3/2020 | Konrardy ............. G05D 1/0221 |
| 2015/0092056 A1 * | 4/2015 | Rau ......................... B60R 11/04 348/148 |
| 2017/0349182 A1 | 12/2017 | Cordova et al. |

* cited by examiner

*Primary Examiner* — Ig T An
(74) *Attorney, Agent, or Firm* — M&B IP Analysts, LLC

(57) ABSTRACT

A system and method for classifying driving behavior. The method includes training, via a supervised machine learning process, a classifier using a labeled training data set including at least one set of training features and corresponding training labels, wherein the classifier is trained to classify driving behavior, wherein the training features include training vehicle telemetries, wherein the training labels include at least one of driver labels and vehicle labels; and applying the classifier to an application data set including a plurality of application features to output a classification of driving behavior based on the application features, wherein the application features are extracted from application data including application vehicle telemetries for a vehicle.

19 Claims, 5 Drawing Sheets

MACHINE LEARNING TECHNIQUES FOR CLASSIFYING DRIVER BEHAVIOR

CROSS-REFERENCE TO RELATED APPLICATIONS

This application claims the benefit of U.S. Provisional Application No. 62/579,565 filed on Oct. 31, 2017, the contents of which are hereby incorporated by reference.

TECHNICAL FIELD

The present disclosure relates generally to driving telemetries, and more specifically to classifying driver behavior based on driving telemetries.

BACKGROUND

With advances in computer technology, computerized navigation and control systems in vehicles have been created to improve drivers' experiences and to allow for remotely controlled transportation of people and goods. To this end, computerized control and management services may collect data remotely from systems deployed in vehicles. For example, a navigation system installed in a vehicle may collect and upload (e.g., via a cellular network) telemetry data such as mechanical data related to components of the vehicle, location data, functional data related to vehicle activities (e.g., movements, use of horn, etc.).

While computerized control and management systems can be incredibly valuable for users, these systems leave vehicles exposed to new dangers. Specifically, malicious entities can control vehicle functions and, therefore, may misappropriate the vehicle for their own purposes. This opens the door to vehicle failure, theft, and other malicious activity, which can lead to damage due to, for example, death or physical injury, loss of property, brand damage, recalls, law suits, and the like. For example, a cyber attacker may be able to control driving systems, lock and unlock the car, turn the engine on or off, and the like.

Additionally, benign entities (such as an owner, renter, or other user of the vehicle) may misuse the vehicle. Specifically, a vehicle user may allow an unauthorized person to drive the vehicle in violation of employment or insurance agreements. Further, a vehicle user may drive while impaired (for example, while intoxicated). In that case, the driving behavior of the user may differ from normal in ways that are dangerous. Identifying unauthorized or impaired use of vehicles may therefore be of interest to drivers, fleet managers, business partners, insurance companies, and others.

Moreover, some companies derive value and insights from knowing how many drivers use a vehicle, how they are driving, and whether the driving is identified as matching that of an existing driver profile. For example, an insurance company may offer a lower insurance rate to safe drivers. In such cases, accurately determining whether driver behavior is safe would be of interest.

It would therefore be advantageous to provide a solution that would allow for detecting vehicle usage patterns and misuse.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

SUMMARY

Figure 1:
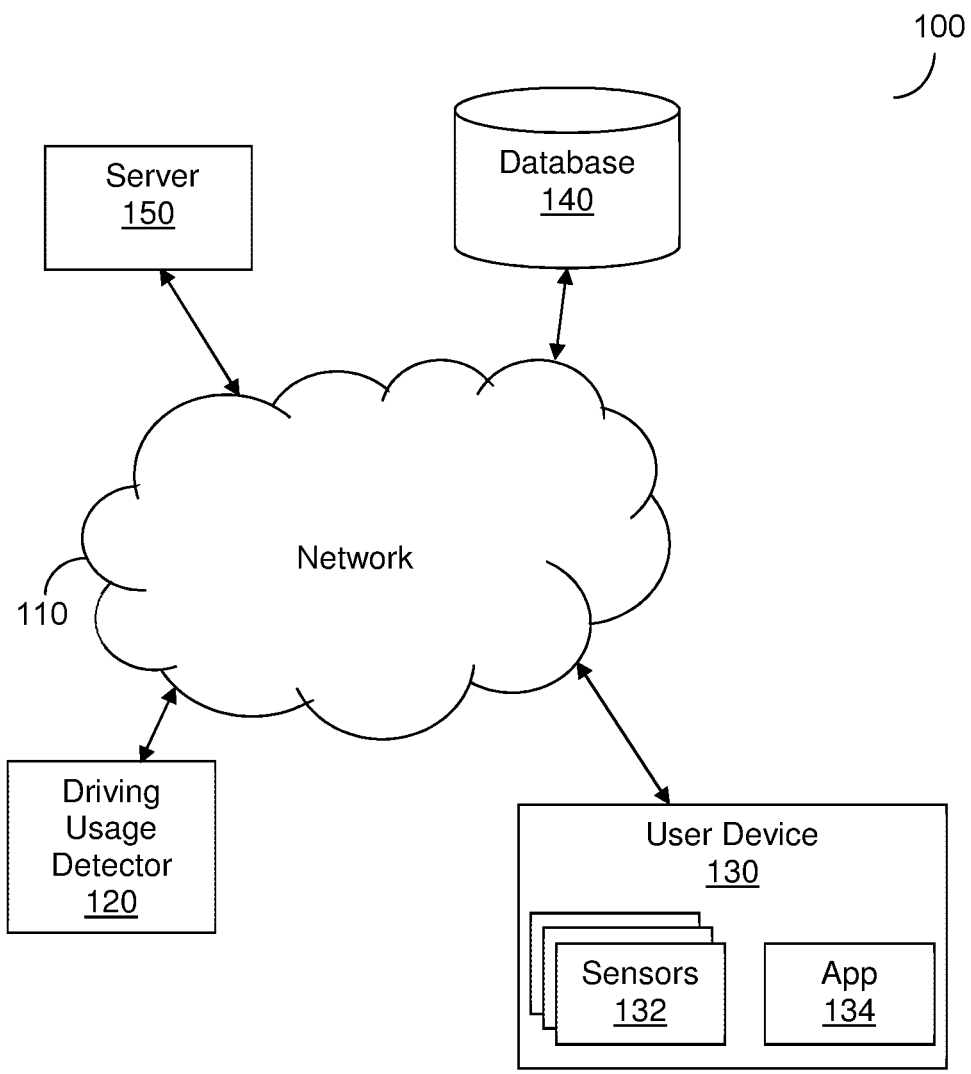
FIG. 1 is a network diagram utilized to describe the various disclosed embodiments.

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for classifying driver behavior. The method comprises: training, via a supervised machine learning process, a classifier using a labeled training data set including at least one set of training features and corresponding training labels, wherein the classifier is trained to classify driving behavior, wherein the training features include training vehicle telemetries, wherein the training labels include at least one of driver labels and vehicle labels; and applying the classifier to an application data set including a plurality of application features to output a classification of driving behavior based on the application features, wherein the application features are extracted from application data including application vehicle telemetries for a vehicle.

Certain embodiments disclosed herein also include a non-transitory computer readable medium having stored thereon causing a processing circuitry to execute a process, the process comprising: training, via a supervised machine learning process, a classifier using a labeled training data set including at least one set of training features and corresponding training labels, wherein the classifier is trained to classify driving behavior, wherein the training features include training vehicle telemetries, wherein the training labels include at least one of driver labels and vehicle labels; and applying the classifier to an application data set including a plurality of application features to output a classification of driving behavior based on the application features, wherein the application features are extracted from application data including application vehicle telemetries for a vehicle.

Certain embodiments disclosed herein also include a system for classifying driver behavior. The system comprises: a processing circuitry; and a memory, the memory containing instructions that, when executed by the processing circuitry, configure the system to: train, via a supervised machine learning process, a classifier using a labeled training data set including at least one set of training features and corresponding training labels, wherein the classifier is trained to classify driving behavior, wherein the training features include training vehicle telemetries, wherein the training labels include at least one of driver labels and vehicle labels; and apply the classifier to an application data set including a plurality of application features to output a classification of driving behavior based on the application features, wherein the application features are extracted from application data including application vehicle telemetries for a vehicle.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for classifying driving behavior using machine learning techniques. A classifier is trained using a labeled training data set including sets of training features and corresponding training labels including driver labels, vehicle labels, or a combination thereof. When the classifier is trained, the classifier is applied to a set of application features extracted from application data. Each set of features includes mechanical telemetries, location telemetries, functional telemetries, or a combination thereof, for a vehicle. The classifier may be utilized to classify the driving behavior with respect to driving behaviors of a driver of the vehicle, and may output a classification such as a particular driver identity (e.g., a match to a driver profile), a group identity associated with a group of drivers, a selection of a driver identifier from among a possible driver identifier list, a known driver as opposed to an unknown driver, a drunk driver as opposed to a sober driver, and the like.

FIG. 1 shows an example network diagram 100 utilized to describe the various disclosed embodiments. The network diagram 100 includes a driving usage detector 120, a collection device 130, a database 140, and a server 150 communicatively connected over a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The collection device 130 is installed or otherwise deployed in a vehicle (not shown) to be monitored, and is configured to collect data indicating operational parameters for the vehicle. To this end, the collection device 130 may include or be communicatively connected to one or more sensors 132 such as, but not limited to, a global positioning system (GPS), accelerometer, gyroscope, and the like. Alternatively or collectively, the collection device 130 may be communicatively connected to a control system or other system of the vehicle (not shown) that is configured to collect data related to operation of the vehicle. For example, the control system may collect data related to vehicle activities such as, but not limited to, starting and stopping the engine, braking, acceleration, deceleration, speed, direction, use of the horn, operation of interior parts, state of mechanical parts (e.g., states related to failure of mechanical parts such as heating and fatigue), and the like.

The collection device 130 may be, but is not limited to, an in-vehicle device such as a control and management system installed in a vehicle. In some implementations, the collection device 130 may be a user device such as, but not limited to, a mobile device (e.g., a smart phone). The user device may be communicatively connected to a control and management system of the vehicle.

In some implementations, the collection device 130 has installed thereon an application (app) 134. The app 134 is configured to receive or retrieve the data collected by the collection device 130 (e.g., data from the sensors 132), and to send the data to the database 140, the server 150, or both. The database 140 may be, for example, a telemetries database storing the collected data remotely from the collection device 130. The server 150 may be a server of a vehicle control or navigation application which receives and utilizes telemetry data from the collection device 130.

In an embodiment, the driving usage detector 120 may be configured to receive or retrieve a labeled training set including groups of telemetries and labels associated with respective groups of telemetries, and to train a classifier based on the labeled training set. The classifier may be utilized to classify application data into classifications such as, for example, behavior of a known driver (e.g., "John Smith"), behavior of an unknown driver (e.g., "one of the usual drivers of vehicle number 123456" or "not one of the usual drivers of vehicle number 123456"), behavior of a group of drivers (e.g., drivers that live in geographical proximity to each other such as drivers in the same state, same country, or within a radius of a geographic location), behaviors of a drunk driver or a sober driver, behaviors of a safe driver or an unsafe driver, behaviors of a tired driver or a refreshed driver, and the like. In some implementations, multiple classifiers may be generated based on different sets of labels for training data.

In an embodiment, when the classifier has been trained, the driving usage detector 120 is configured to, for example, retrieve application telemetries for a vehicle that are stored in the database 140, to receive the telemetries from the server 150, a network device (not shown) and the like. The driving usage detector 120 is configured to analyze the telemetries via machine learning. Specifically, the driving usage detector 120 may be configured to input features to the classifier based on the telemetries for the vehicle, and to classify the input features of the vehicle with respect to the driver of the vehicle. As noted above, the classifications may include, for example, a driver profile representing behavior of a particular driver, a vehicle profile representing behavior of a known driver or an unknown driver, behavior of a drunk driver or a sober driver, behavior of a tired driver or a refreshed driver, and the like.

The driver profile may be an explicit profile or an implicit profile. An explicit profile expressly indicates a particular driver whose behavior matches the analyzed telemetries. For example, the explicit profile may indicate a name (e.g., "John Smith"), an identification (ID) number (e.g., the ID "1234567" associated with John Smith), and the like. An implicit profile may be or may include an anonymous identification of a particular driver's behavior. As a non-limiting example, different driver behaviors may be listed as "Driver A Behavior," "Driver B Behavior," and so on. As another non-limiting example, different driver behaviors may be "Behavior of the Driver of Vehicle X," "Behavior of the Driver of Vehicle Y," and so on. Thus, the implicit profile may allow for identifying differences in driving behavior among different drivers without exposing or otherwise requiring explicit identification of each driver.

In an embodiment, the profiles may be grouped with respect to location such that drivers or vehicles that drive in locations that are geographically proximate are grouped. To this end, locations of drivers or vehicles may be grouped into clusters of locations that collectively represent a driving area that is common to each cluster. A profile is created for each driver or vehicle. Each profile at least defines the locations that the respective driver or vehicle is expected to be at a given time (e.g., a time of day, time of the week, a combination thereof, etc.) with respect to one or more of the clusters of locations including the geographic locations indicated in the labeled training data.

In an embodiment, the driving usage detector 120 may be further configured to extract the features in the received or retrieved telemetries to be utilized by the classifier. The extracted features may include, but are not limited to, application mechanical telemetries, application functional telemetries, application location telemetries, a combination thereof, and the like. The mechanical telemetries may include, but are not limited to mechanical states of components (e.g., temperature, pressure, fatigue, etc.), internal vehicle commands (e.g., instructions sent to particular components of the vehicle), and the like. The functional telemetries may include, but are not limited to, actions by the vehicle or the driver such as opening and closing of the doors, time data, starting and stopping of the engines, brake usage, acceleration and deceleration, speed, use of the horn, turning, and the like. The location telemetries may include, but are not limited to, latitude, longitude, altitude, direction, and the like.

The features may be extracted using dimensionality reduction techniques such as, but not limited to, principal component analysis (PCA), kernel PCA, and the like. More specifically, the kernel PCA may be based on Laplacian eigenmaps, diffusion maps, and the like.

In a further embodiment, the driving usage detector 120 may be configured to normalize the telemetries prior to extraction of features to allow for recognition of comparable data in different formats. The normalization may be performed with respect to vehicle type, information source, or both. To this end, the normalization may be performed in two levels, with each level including normalizing the telemetries with respect to one of vehicle type and information source. Data from different types of vehicles and from different information sources may be received in different formats and, therefore, may not be properly recognized as comparable during feature extraction. The different information sources may include, but are not limited to, different telematics protocols, different customers, and the like.

Classifying the telemetry data with respect to driver behavior data (e.g., functional and mechanical data) allows for developing driver profiles that uniquely identify different drivers via machine learning of driving performance. Classifying the telemetry data with respect to environmental telemetries (e.g., location and time) also allows for strengthening accuracy of classifications with respect to environmental behaviors (e.g., typical locations and times of driving by different drivers). Accordingly, although the extracted features may include a subset of the above-mentioned example features, more features will allow for faster and more accurate classification.

Classifying the telemetry data with respect to driving behavior and environmental telemetries allows for further developing the user profiles to account for changes in vehicle performance (e.g., acceleration rate, top speed, grip, etc.) and difficulty of navigation (e.g., on roads with many turns, uphill or downhill straights, combinations thereof, etc.). As non-limiting examples, different drivers may respond differently when driving on different surfaces (e.g., a paved road as opposed to a rocky or brick road), when taking tight turns as opposed to wide turns, when driving uphill and downhill, and the like.

Further, at least in some circumstances, detecting misuse based on such classifications allows for more accurately identifying an improper driver than, for example, based on use of a particular user device. For example, in a car sharing service, a thief may take the driver's mobile device and utilize the mobile device to gain access to controls of the car. In that case, identifying the correct mobile device alone would not result in identifying that the driver is the wrong person.

In an embodiment, based on the classification of the application data, the driving usage detector 120 is configured to determine whether the vehicle is misused. The vehicle may be misused when the determined classification does not match a predetermined required classification for the vehicle. The required classification may be, but is not limited to, a classification of one or more drivers (e.g., drivers registered as owning, renting, or insured for driving the vehicle), a required state of the driver (e.g., sober), or a combination thereof. The determined misuse may be utilized to detect issues such as, but not limited to, car theft, identity theft, fraud (e.g., a vehicle insured for one driver being used by two or more drivers, a driver switching to another driver to avoid liability after an accident, etc.), improper sharing (e.g., use of the vehicle by another driver that is not covered by, for example, an insurance plan), intoxicated driving, tired driving, and the like. The misuse may be determined based on one or more misuse rules defining a vehicle misuse policy. To this end, the misuse rules may be applied to the determined classification to determine whether the vehicle is misused.

In another embodiment, based on the classification of the application data, the driving usage detector 120 is configured to determine a driving style profile of the driver of the vehicle. For example, the classifications may include profiles of known drivers having different driving styles (e.g., "cautious," "moderate," "reckless," etc.). The driving usage detector may be further configured to determine a risk score for the driver. In an example implementation, each known driver having one of the different driving styles may be associated with a risk score, where the risk score represents a relative degree of risk for driving by the driver. Thus, classifying a driver's behavior and usage of the vehicle into one of the driving styles allows for determining a risk of accidents and other driving issues.

In yet another embodiment, based on multiple classifications (i.e., identification of multiple drivers having different classifications as indicated in the application data), the driving usage detector 120 is configured to determine a number of drivers. The driving usage detector 120 may be further configured to determine a relative amount of usage of each driver. As a non-limiting example, it may be determined that a first driver uses the vehicle 80% of the time and a second driver uses the vehicle 20% of the time.

The driving usage detector 120 may be configured to generate a notification including a driving profile associated with the classification of the application data. To this end, the notification may indicate, for example, an identification of a known (e.g., "John Smith") or unknown ("usual driver of Vehicle X") driver, whether the driving behavior is drunk or sober, whether the driving behavior is safe or unsafe, a risk score or other identification of degree of risk, a number of drivers, relative usage amounts for different drivers, combinations thereof, and the like.

It should be noted that the sensors 132 are shown as being included in the collection device 130 merely for example purposes, and may equally be separate from and communicatively connected to the collection device 130 without departing from the scope of the disclosure. The sensors 132 may be communicatively connected to a vehicle internal communications network of a vehicle, for example, via a Controller Area Network bus, either directly or via the On-Board Diagnostics 2 (OBD-II) Port.

Figure 2:
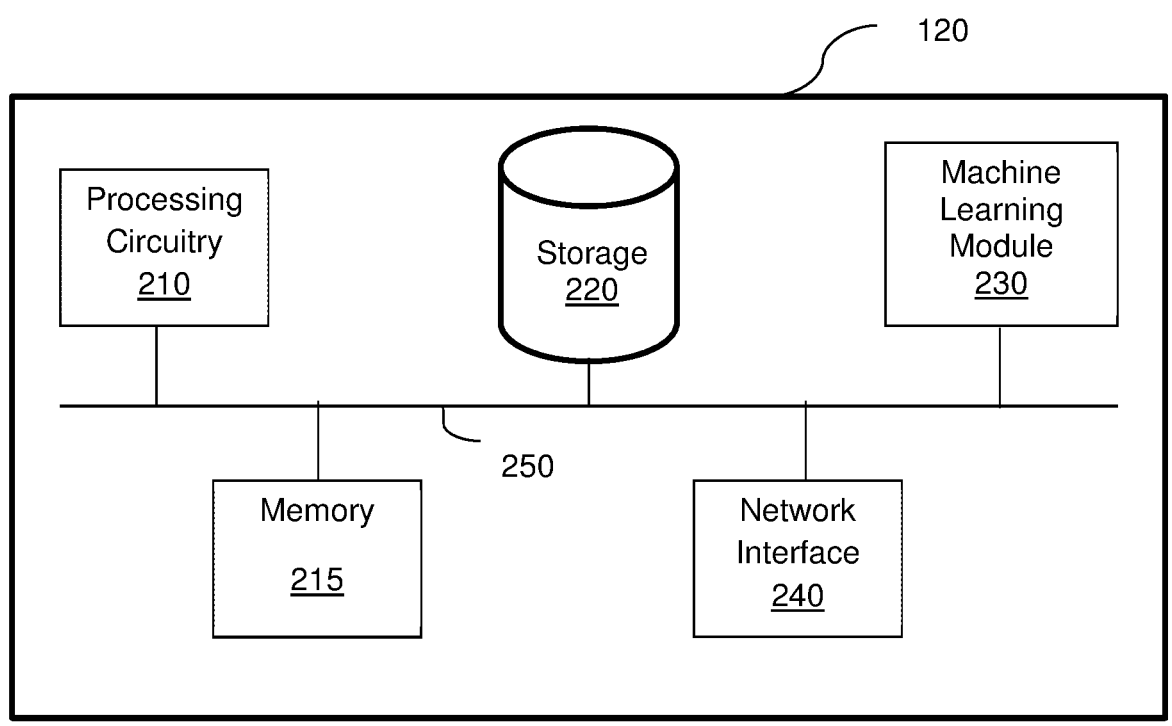
FIG. 2 is a schematic diagram of a driving usage detector according to an embodiment.

FIG. 2 is an example schematic diagram of the driving usage detector 120 according to an embodiment. The driving usage detector 120 includes a processing circuitry 210 coupled to a memory 215, a storage 220, a machine learning module 230, and a network interface 240. In an embodiment, the components of the driving usage detector 120 may be communicatively connected via a bus 250.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 215 may be volatile (e.g., RAM, etc.), non-volatile (e.g., ROM, flash memory, etc.), or a combination thereof. In one configuration, computer readable instructions to implement one or more embodiments disclosed herein may be stored in the storage 220.

In another embodiment, the memory 215 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein.

The storage 220 may be magnetic storage, optical storage, and the like, and may be realized, for example, as flash memory or other memory technology, CD-ROM, Digital Versatile Disks (DVDs), or any other medium which can be used to store the desired information.

The machine learning module 230 is configured to train and utilize classifiers to identify drivers based on driving telemetries. The input features to the machine learning module may include driving telemetries, and the output includes classification of the driver based on the driving behavior.

The network interface 240 allows the driving usage detector 120 to communicate with the collection device 130, the database 140, the server 150, or a combination of, for the purpose of, for example, receiving and retrieving telemetry data. Additionally, the network interface 240 allows the driving usage detector 120 to communicate with a third-party device (e.g., the server 150 or another device such as a device operated by a consumer of driving classifications) for sending notifications of vehicle usage and misuse.

It should be understood that the embodiments described herein are not limited to the specific architecture illustrated in FIG. 2, and other architectures may be equally used without departing from the scope of the disclosed embodiments.

Figure 3A:
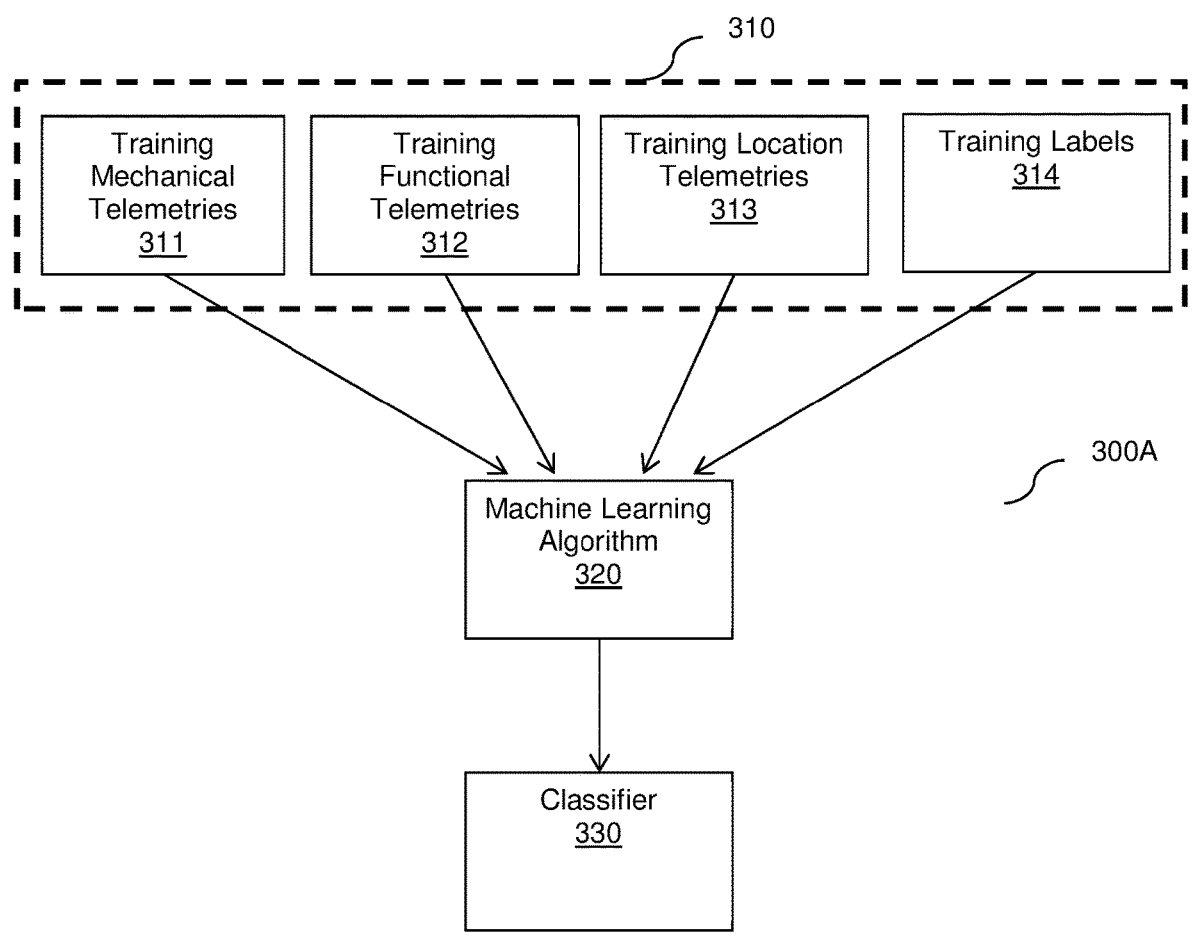
FIGS. 3A and 3B are flow diagrams illustrating a training phase and a test phase, respectively, of a method for classifying driver behavior according to an embodiment.

FIG. 3A shows an example flow diagram 300A illustrating a training phase of a method for classifying driving behavior according to an embodiment. A labeled training set 310 is fed to a machine learning algorithm 320 to generate a classifier 330.

The labeled training set 310 includes sequences of training inputs such as training mechanical telemetries 311, training functional telemetries 312, training location telemetries 313, and training labels 314. The mechanical telemetry sequence 311 may include, but is not limited to, mechanical states of vehicle components and vehicle commands to internal components (e.g., commands by a vehicle control system). The functional telemetry sequence 312 may include, but is not limited to, opening and closing vehicle doors, engine start and stop, brake usage, acceleration, deceleration, vehicle speed, engine speed, use of horn, turning, and the like. The location telemetry sequence 313 may include, but is not limited to, latitude, longitude, altitude, and direction.

The training labels 314 include driver labels, vehicle labels, or both. Each of the driver labels indicates a characteristic of the driver for the associated mechanical, functional, and location telemetries such as, but not limited to, an identifier of a known driver, a group of drivers to which the driver belongs, and the like. Thus, the training labels in combination with the training features allow for establishing baseline behaviors for certain drivers, groups of drivers, drivers of certain vehicles or groups of vehicles, conditions of drivers (e.g., drunk or sober, tired or refreshed, etc.), and the like. To this end, each of the driver labels may be explicit (i.e., identifying a specific driver by name or other direct identifier) or implicit (i.e., identifying known driving behavior of a driver without explicitly identifying the driver). The vehicle labels may be utilized to identify a driver with respect to a particular vehicle or group of vehicles. The labeled training set 310 may be sampled based on a predefined sampling scheme.

Figure 3B:
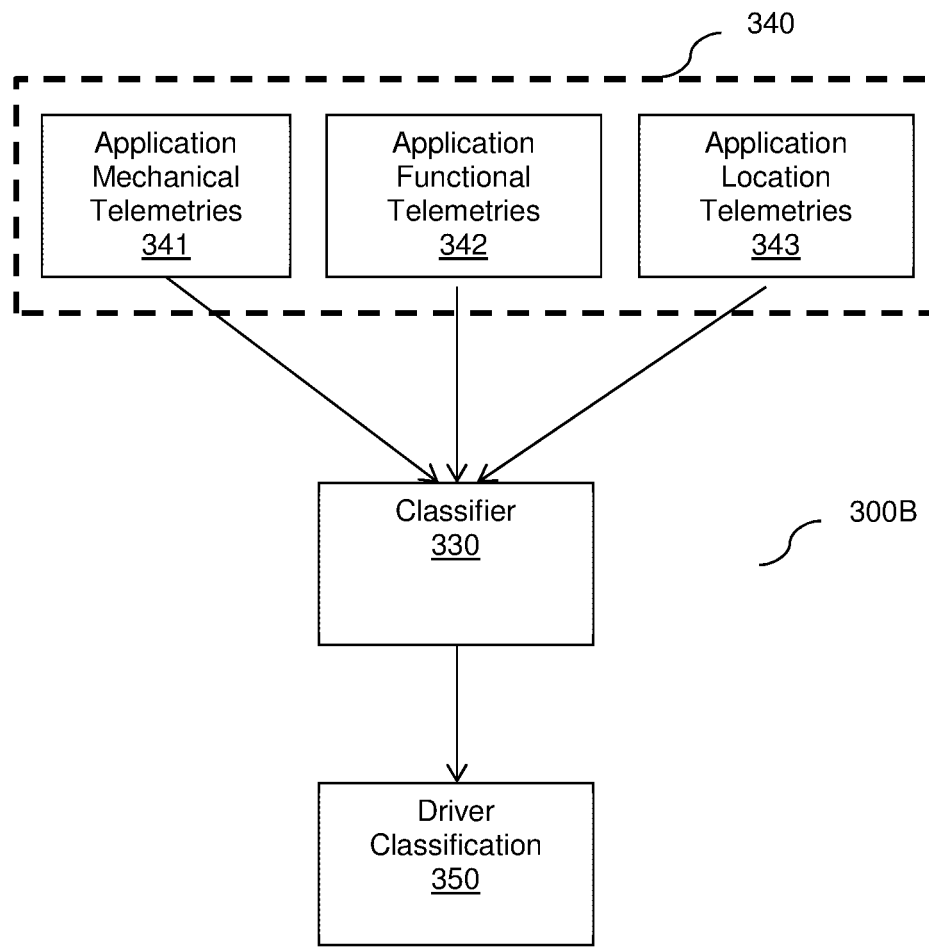

FIG. 3B shows an example flow diagram 300B illustrating an application phase of a method for classifying driving behavior according to an embodiment. A driver classification 350 is generated based on an application input set 340 using the classifier 330. The driver classification 350 may be, for example, an identity of a particular driver, a known driver or an unknown driver, a drunk driver or a sober driver, an identifier of a known driving profile (e.g., "driving profile number 1540"), and the like.

The application input set 310 includes sequences of application inputs such as application mechanical telemetries 311, application functional telemetries 312, and application location telemetries 313. The application input set 310 may be extracted from data collected by a collection device deployed in a vehicle.

Figure 4:
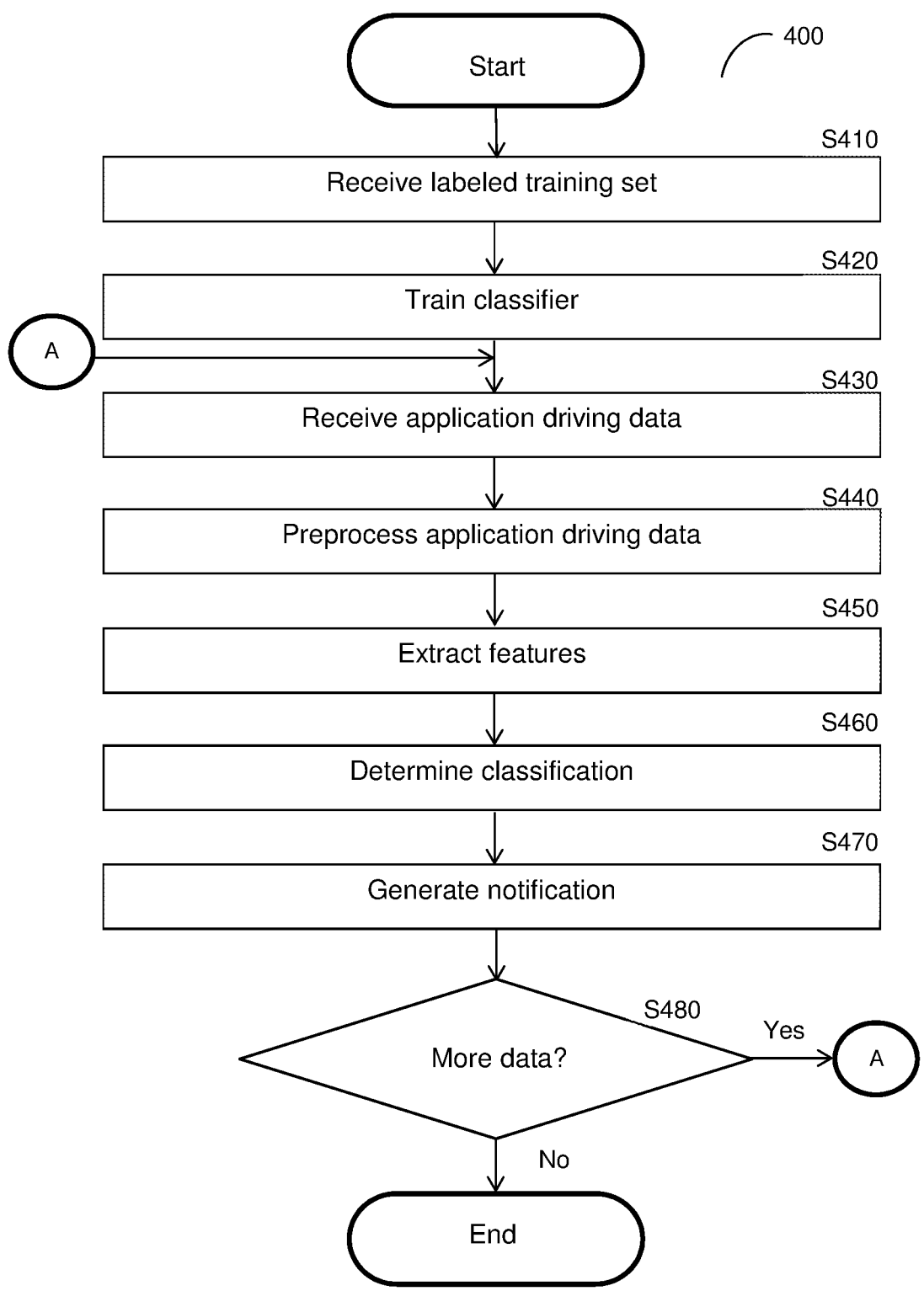
FIG. 4 is a flowchart illustrating a method for classifying driver behavior according to an embodiment.

FIG. 4 is a flowchart 400 illustrating a method for detecting vehicle misuse according to an embodiment.

At S410, a labeled training set is received. The labeled training set includes training inputs and training outputs. The training inputs include telemetries such as, but not limited to, training mechanical telemetries, training functional telemetries, training location telemetries, a combination thereof, and the like. The training outputs include training labels such as driver labels indicating a driver or driver group identifier for each subset of the training data, vehicle labels indicating a vehicle or group of vehicles for each subset of the training data, or both. The training inputs may have a predetermined input structure.

At S420, one or more classifiers is generated based on the labeled training set. In an embodiment, S420 may further include testing, validation, or both, of each classifier. The testing and validation may be utilized to, e.g., refine, validate, or otherwise provide more accurate classifications. One of the generated classifiers is trained to categorize driving data into particular drivers or groups of drivers (e.g., drivers or groups of drivers indicated by driver or driver group identifiers of the training labels) or particular vehicles or groups of vehicles (e.g., as indicated by vehicle labels of the training labels). Thus, such a classifier may be a multi-class classifier trained to categorize data into one of more than two categories. In some implementations, one of the generated classifiers may be a binary classifier trained to, for example, categorize driving data into either drunk driving behavior or sober driving behavior, or otherwise to classify driving behavior into acceptable use or misuse.

Different classifiers may be utilized in combination (e.g., by applying each classifier to the same data set) to, for example, identify different types of potential misuse, identify different aspects of usage, and the like. Potential misuses may include, but are not limited to, car theft, identify theft, fraud (e.g., use by a driver who is not authorized by a third party to drive the vehicle), drunk driving, tired driving, and the like. For example, in an implementation where a driver classifier and a sobriety classifier are both utilized, it may be determined who is the driver and whether the driver is drunk. The different aspects of usage may include, but are not limited to, driving style and risk of each driver, a number of drivers, relative amounts of usage of different drivers using the vehicle, a driving usage profile, similarity to a known driving profile, and the like.

At S430, application driving data is received or retrieved. The application driving data relates to driving behaviors to be analyzed to determine whether the vehicle is being misused.

At optional S440, the received application driving data may be preprocessed. In an embodiment, preprocessing the application driving data includes normalizing the application driving data with respect to vehicle type, information source, or both, as described further herein above. Normalizing the data with respect to vehicle type and information source allows for ensuring comparable data is properly used by the classifier and, specifically, the normalization is with respect to factors (i.e., vehicle type and information source) that typically affect the format of the data. Telemetries that are formatted differently may result in inaccurate or otherwise improper classifications.

At S450, features to be utilized as inputs to the classifiers are extracted based on the application driving data. The features are related to behavior of the driver and of the vehicle. In an embodiment, the extracted features may include, but are not limited to, application mechanical telemetries, application functional telemetries, application location telemetries, a combination thereof, and the like. In an embodiment, S440 may include analyzing the driving data, applying at least one transformation to the driving data, or both.

At S460, one or more classifications is determined. In an embodiment, S460 includes applying one or more of the generated classifiers to the determined features. In an example implementation, the determined classification is an identity of a particular driver, a driver belonging to a particular group of drivers, a driver of a particular vehicle, or a driver of a vehicle belonging to a particular group of vehicles. In another example implementation, the determined classifications may indicate whether the driver is drunk or sober.

At optional S470, a notification may be generated. The notification may indicate the classifications. The notification may be sent to, e.g., a mobile device of an owner of the vehicle, a driving enforcement authority (e.g., a police department), a driving security service (e.g., a provider of a vehicle security application), a fleet manager, and the like.

In an embodiment, S470 may further include determining whether the vehicle is misused, determining how the vehicle is used, both, and the like. The notification indicates whether the vehicle is misused, how the vehicle is used, both, and the like.

The vehicle is misused when the determined classification does not match a required classification for the vehicle. To this end, the vehicle may be misused when, for example, the classification does not match any driver identifier assigned to the vehicle, when the classification does not match any driver group identifier assigned to the vehicle (e.g., with respect to clusters of locations associated with the driver group), or when the driver is classified as a drunk driver. To this end, S470 may include comparing the determined classification to one or more predetermined driver identifiers associated with the vehicle. How the vehicle is used may include, but is not limited to, how many drivers use the vehicle, which drivers use the vehicle, how the vehicle is used (e.g., drunk or sober, safe or unsafe, relative degrees of risk, etc.), and the like.

At S480, it is determined if additional application data has been received and, if so, execution continues with S430; otherwise, execution terminates. In an embodiment, additional application data may be received continuously or periodically, thereby allowing for monitoring driving behavior over time to detect changes in drivers or driver usage patterns.

It should be noted that, in some embodiments, the steps S410 and S420 may be performed offline, at a remote time from the other steps of the method of FIG. 4, or both.

It should also be noted that the embodiments disclosed herein are described as utilizing classification to categorize drivers, but the disclosed embodiments may be equally applicable to other machine learning techniques for categorizing data. For example, a clustering process may be utilized to group data into distinct driver profiles.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for classifying driving behavior, comprising:
   training, via a supervised machine learning process, a classifier using a labeled training data set including at least one set of training features and corresponding training labels, wherein the classifier is trained to classify driving behavior, wherein the training features include training vehicle telemetries, wherein the training labels include a plurality of driving labels, wherein each of the plurality of driving labels indicates a characteristic of a respective distinct driver of a plurality of drivers; and
   applying the classifier to an application data set including a plurality of application features to output a classification of driving behavior based on the application features, wherein the application features are extracted from application data including application vehicle telemetries for a vehicle.

2. The method of claim 1, wherein each of the training vehicle telemetries and the application vehicle telemetries includes at least one of: mechanical telemetries, location telemetries, and functional telemetries.

3. The method of claim 2, wherein each of the training vehicle telemetries and the application vehicle telemetries includes the mechanical telemetries, wherein the mechanical telemetries include at least one of mechanical states of vehicle components and internal vehicle commands.

4. The method of claim 2, wherein each of the training vehicle telemetries and the application vehicle telemetries includes the functional telemetries, wherein the functional telemetries include at least one of actions by the vehicle, actions by a driver of the vehicle, times, starting an engine, stopping an engine, brake usage, acceleration, deceleration, speed, use of a horn, and turning.

5. The method of claim 1, further comprising:
   normalizing the application vehicle telemetries with respect to at least one of vehicle type and information source.

6. The method of claim 1, further comprising:
   determining that vehicle misuse has occurred when the classification does not match a required classification for the vehicle.

7. The method of claim 6, wherein the vehicle misuse is at least one of: car theft, identity theft, fraud, improper sharing, intoxicated driving, and tired driving.

8. The method of claim 1, further comprising:
   determining, based on the classification, a driving style profile for a driver of the vehicle.

9. The method of claim 1, wherein the classifier is trained to classify driving behavior with respect to at least one driver, wherein the classification indicates a driver identity.

10. A non-transitory computer readable medium having stored thereon instructions for causing a processing circuitry to execute a process, the process comprising:
    training, via a supervised machine learning process, a classifier using a labeled training data set including at least one set of training features and corresponding training labels, wherein the classifier is trained to classify driving behavior, wherein the training features include training vehicle telemetries, wherein the training labels include a plurality of driving labels, wherein each of the plurality of driving labels indicates a characteristic of a respective distinct driver of a plurality of drivers; and
    applying the classifier to an application data set including a plurality of application features to output a classification of driving behavior based on the application features, wherein the application features are extracted from application data including application vehicle telemetries for a vehicle.

11. A system for classifying driving behavior, comprising:
    a processing circuitry; and
    a memory, the memory containing instructions that, when executed by the processing circuitry, configure the system to:
    training, via a supervised machine learning process, a classifier using a labeled training data set including at least one set of training features and corresponding training labels, wherein the classifier is trained to classify driving behavior, wherein the training features include training vehicle telemetries, wherein the training labels include a plurality of driving labels, wherein each of the plurality of driving labels indicates a characteristic of a respective distinct driver of a plurality of drivers; and
    applying the classifier to an application data set including a plurality of application features to output a classification of driving behavior based on the application features, wherein the application features are extracted from application data including application vehicle telemetries for a vehicle.

12. The system of claim 11, wherein each of the training vehicle telemetries and the application vehicle telemetries includes at least one of: mechanical telemetries, location telemetries, and functional telemetries.

13. The system of claim 12, wherein each of the training vehicle telemetries and the application vehicle telemetries includes the mechanical telemetries, wherein the mechanical telemetries include at least one of mechanical states of vehicle components and internal vehicle commands.

14. The system of claim 12, wherein each of the training vehicle telemetries and the application vehicle telemetries includes the functional telemetries, wherein the functional telemetries include at least one of actions by the vehicle, actions by a driver of the vehicle, times, starting an engine, stopping an engine, brake usage, acceleration, deceleration, speed, use of a horn, and turning.

15. The system of claim 11, wherein the system is further configured to:
  normalize the application vehicle telemetries with respect to at least one of vehicle type and information source.

16. The system of claim 11, wherein the system is further configured to:
  determine that vehicle misuse has occurred when the classification does not match a required classification for the vehicle.

17. The system of claim 16, wherein the vehicle misuse is at least one of: car theft, identity theft, fraud, improper sharing, intoxicated driving, and tired driving.

18. The system of claim 11, wherein the system is further configured to:
  determine, based on the classification, a driving style profile for a driver of the vehicle.

19. The system of claim 11, wherein the classifier is trained to classify driving behavior with respect to at least one driver, wherein the classification indicates a driver identity.

\* \* \* \* \*